United States Patent [19]
Kosko et al.

[11] Patent Number: 5,539,769
[45] Date of Patent: Jul. 23, 1996

[54] ADAPTIVE FUZZY FREQUENCY HOPPING SYSTEM

[75] Inventors: Bart Kosko, Hacienda Heights; Peter J. Pacini, Bakersfield, both of Calif.

[73] Assignee: University of Southern California, Los Angeles, Calif.

[21] Appl. No.: 219,584

[22] Filed: Mar. 28, 1994

[51] Int. Cl.$^6$ ............................. H04B 1/69; H04B 1/713; G06G 7/00

[52] U.S. Cl. ........................... 375/200; 375/202; 380/34; 380/46; 331/78; 364/717; 395/3; 395/61; 395/900

[58] Field of Search .......................... 375/1, 38, 200–210, 375/260; 380/34, 46; 455/69; 395/3, 61, 900; 331/78; 364/717, 274, 6

[56] References Cited

U.S. PATENT DOCUMENTS

| | | | |
|---|---|---|---|
| 4,066,964 | 1/1978 | Costanza et al. | 375/38 |
| 5,239,560 | 8/1993 | Daniel | 375/38 |
| 5,305,468 | 4/1994 | Bruckert et al. | 455/69 |
| 5,353,311 | 10/1994 | Hirata et al. | 375/1 |

OTHER PUBLICATIONS

Pacini et al., "Adaptive Fuzzy Frequency Hopper", article submitted to the IEEE Transactions on Communications in 1993.

Bart Kosko, "Fuzzy Systems as Universal Approximators"; IEEE Transactions on Computers, (vol. 43, No. 11; Nov. 94; pp. 1329–1333.

Pacini et al, "Adaptive fuzzy systems for target tracking"; Intelligent Systems Engineering, (vol. 1, No. 1; Fall 1992).

L. A. Zadeh, "Probability Measures of Fuzzy Events"; Journal of Mathematical Analysis and Applications, (pp. 421–427, 1968).

*Primary Examiner*—Bernarr E. Gregory
*Attorney, Agent, or Firm*—Benman, Collins & Sawyer

[57] ABSTRACT

A system and method for fuzzy spread spectrum communication. The system includes a fuzzy spreader for spreading an input signal over a range of frequencies and fuzzy despreader for extracting the spread input signal from the range of frequencies. In the illustrative implementation, the inventive system a fuzzy pseudo-random generator for use in the fuzzy spreader and the fuzzy despreader. The fuzzy pseudo-random generator uses a novel method for generating pseudo-random numbers. It does not use encryption or decryption techniques. The invention further provides a method for adaptive rule generation and a novel method for identifying the centroid of the set of output numbers. This allows the fuzzy system to learn spreading rules that favor data compression, compact multiplexing, bandwidth conservation, and other communication tasks as well as rules that favor security.

20 Claims, 3 Drawing Sheets

FIG. 2
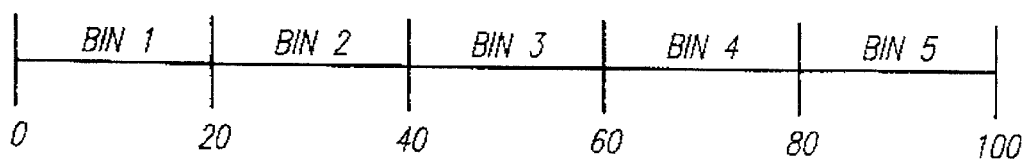
FIG. 3
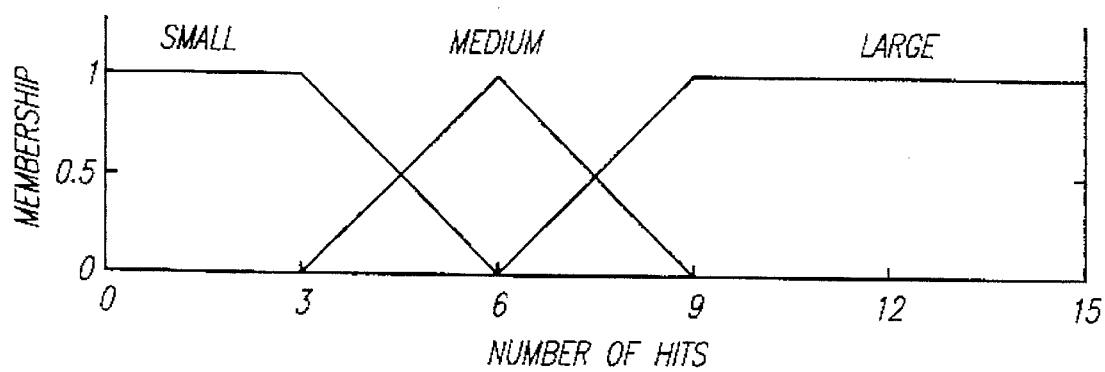
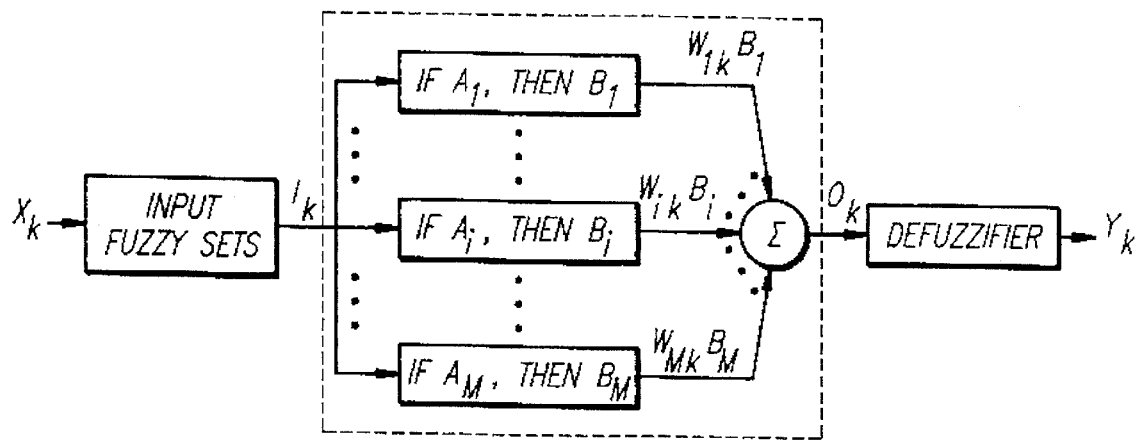
FIG. 4

ADAPTIVE FUZZY FREQUENCY HOPPING SYSTEM

BACKGROUND OF THE INVENTION

1. Field of the Invention

The present invention relates to wireless communication systems. More specifically, the present invention relates to systems and techniques for securing wireless communication systems such as spread spectrum systems.

2. Description of the Related Art

Security is a key issue in wireless communication systems such as cellular telephone systems, satellite communication systems and two-way radio links. Whether communication of voice or data is required and whether for military, commercial or consumer use, it is imperative that the link be secured from eavesdroppers or interferers whether intentional or otherwise.

Spread spectrum technology was developed to improve the security of wireless communication systems. In spread spectrum systems a carrier signal, which modulates input data, is moved or hopped over a band or spectrum of frequencies. A frequency hopping system spreads the energy of a transmitted signal across a bandwidth larger than the minimum required for the signal. The frequency hopping occurs many times per second. The transmitter and receiver must stay synchronized and hop to the same frequency at the same time.

A spread spectrum system offers some measure of security inasmuch as an eavesdropper or an interferer must know the frequency hopping sequence and hop in unison with the transmitter or the receiver of the system. If an eavesdropper does not know the frequency sequence, detection or interference become more difficult to achieve. Nonetheless, if the frequency hopping sequence repeats, detection of the frequency hopping sequence becomes possible and the security of the system is limited accordingly.

Pseudo-random frequency hopping sequences are used to prevent detection of a repeating frequency hopping sequence. These systems use a pseudo-random number generator to produce a substantially random sequence of hopping frequencies. This sequence is provided to both the transmitter and the receiver in advance of transmission. To the eavesdropper, the hopped signal appears to be low intensity noise spread over the entire bandwidth.

Unfortunately, however, since the output of a pseudo-random generator is "pseudo-random" and not "random", the output of a pseudo-random generator repeats. Accordingly, the degree to which these systems are secure is limited. Hence, there is an ongoing need in the art for systems and techniques to improve the security of wireless communication systems.

SUMMARY OF THE INVENTION

The present invention addresses the need in the art by providing a system and method for fuzzy spread spectrum communication. In a most general sense, the inventive system includes a fuzzy spreader for spreading an input signal over a range of frequencies and fuzzy despreader for extracting the spread input signal from the range of frequencies.

In the illustrative implementation, the inventive system a fuzzy pseudo-random generator for use in the fuzzy spreader and the fuzzy despreader. The fuzzy pseudo-random generator uses a novel method for generating pseudo-random numbers. In accordance with the inventive method, a plurality of pseudo-random numbers is generated out of a predetermined range of N distinct possible integer numbers over each of a plurality of predetermined time intervals. These numbers relate to distinct frequencies that can be generated by the frequency synthesizer. Next, the predetermined range of N distinct numbers is partitioned into n bins, each bin containing N/n of the possible distinct numbers. The pseudo-random numbers are sampled to provide a plurality of pseudo-random samples having a minimum auto-correlation and a minimum time delay therebetween. The number of samples that fall into each bin is counted to provide a count for each bin. A number of fuzzy sets is defined for each bin relating to the number of samples in each bin. The count in each bin is mapped into the sets. Each count belongs to each set in some proportion and the total extent to which each count belongs to all of the sets is equal to unity. Fuzzy "if-then" rules are applied to the sets to determine a firing level of each rule over each predetermined time interval. The rules cover a graph of a random function. Each conjunct in each antecedent of each rule is equal to a fit value corresponding to the extent to which each count belongs to each set. Next, the extent to which each rule is activated is determined by identifying a minimum fit value for antecedent of each rule. The consequent of each rule is weighted in proportion to the extent that the antecedent of each rule is activates. Each of the weighted consequents is summed to create a set of pseudo-random fuzzy output numbers, one for each frequency bin. This set is defuzzified to provide an output pseudo-random number. The system does not use encryption or decryption techniques.

The invention further provides a method for adaptive rule generation and a novel method for identifying the centroid of the set of output numbers. This allows the fuzzy system to learn spreading rules that favor data compression, compact multiplexing, bandwidth conservation and other communication techniques as well as rules that favor security.

BRIEF DESCRIPTION OF THE DRAWINGS

FIG. 2 shows a partitioned spectrum for N=100 and n=5 in accordance with the method of the present invention.

FIG. 3 shows the association of input fuzzy sets for each bin in accordance with the inventive method.

FIG. 4 shows the parallel algorithmic structure of the fuzzy system of the present invention.

DESCRIPTION OF THE INVENTION

Figure 1:
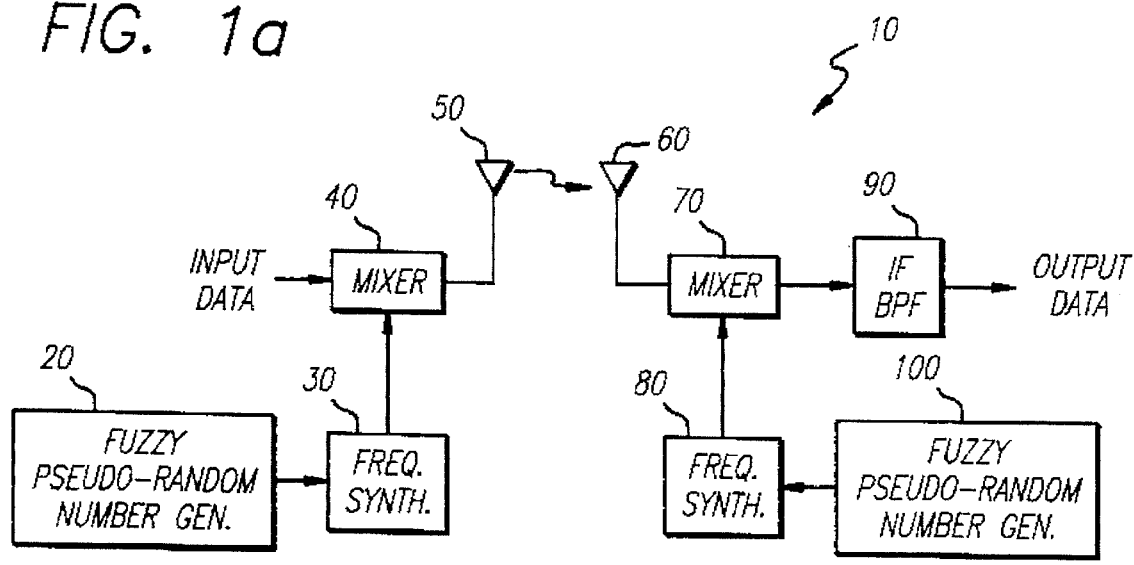
FIG. 1a is a simplified block diagram of the an illustrative implementation of the fuzzy frequency hopping spread spectrum communications system of the present invention.
FIG. 1b is a simplified block diagram of the fuzzy pseudo-random generator of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof.

A frequency hopping system spreads the energy of a transmitted signal across a bandwidth larger than the minimum required for the signal. It spreads the signal when it changes or "hops" the transmission frequency many times per second. The transmitter and receiver must stay synchronized, that is, the transmitter and the receiver must hop to the same frequency at the same time. If an eavesdropper does not know the frequency hopping sequence, the hopped signal looks like low-intensity noise spread over the entire bandwidth. Frequency hopping systems use a pseudo-random number (PN) generator to produce a "pseudo-random" sequence of frequencies. Whatever the code used, both the transmitter and the receiver must have a copy of the code or the procedure to generate the code.

The most common modulation scheme for frequency hopping is M-ary frequency shift keying or MPSK as set forth in equation [1] below:

$$s_k \in \{0, m-1\}, \quad s(t) = \sin(f(y_k) + s_k \Delta f). \tag{1}$$

where $s_k$ is the data sent at time k, $y_k$ is the output of the PN generator in the transmitter and receiver, and s(t) is the waveform sent.

As mentioned above, since the pseudo-random generator output is not truly random, the security of the system is limited. The present invention provides an improved frequency hopping spread spectrum communications system which incorporates fuzzy logic to increase the randomness of the frequency hopping scheme.

As discussed in "Fuzzy Logic" by Bart Kosko and Satoru Isaka in the July 1993 issue of Scientific American, pp. 76–81, fuzzy logic is a branch of machine intelligence that helps computers paint gray common sense pictures from an uncertain world. (See also *Fuzzy Thinking*, by Bart Kosko, published by Hyperion Press, 1993, 1st ed.) Fuzzy systems use common sense rules that refer to indefinite quantities that measure the degree to which something occurs or some condition exists. Fuzzy logic is based on rules of the form "if-then" that convert inputs to outputs, one fuzzy set to another. To build a fuzzy system, one defines the degrees of membership in various fuzzy input and output sets with sets of curves. The relation between the input and output sets can be plotted. The product of the fuzzy sets forms a fuzzy patch, an area in the input/output graph that represents the set of all associations that the rule forms between the inputs and the outputs. The size of the patch reflects the vagueness or uncertainty of the rule. The more precise the fuzzy set, the smaller it becomes. The rules of a fuzzy system define a set of overlapping patches that relate a full range of inputs to a full range of outputs. In that sense, the fuzzy system approximates some mathematical function or equation of cause and effect.

Fuzzy systems can approximate any continuous mathematical function. A fuzzy system reasons or infers based on its rule patches. Two or more rules convert any incoming number into some result because the patches overlap. When data trigger the rules, overlapping patches fire in parallel but only to some degree. The degree to which the rules fire determines the proportionality of the curves which represent the rules in a curve of the output data set. Since, this output curve does not assist controllers that act on binary instructions, a final step is a process of defuzzification in which the fuzzy output curve is turned into a single numerical value. This is typically achieved by computing the center of mass, or centroid, of the area under the curve. As systems become more complex, the antecedents of the rules may include any number of terms conjoined by "and" or disjoined by "or".

In accordance with the present teachings, the principles of fuzzy logic systems are adapted to provide an improved spread spectrum communications system.

FIG. 1a is a simplified block diagram of the an illustrative implementation of the fuzzy frequency hopping spread spectrum communications system of the present invention. The inventive system 10 includes a fuzzy pseudo-random number generator 20 which, in accordance with the method set forth below, provides pseudo-random integer inputs to a conventional frequency synthesizer 30. The synthesizer 30 provides a carrier signal to a conventional mixer 40. The mixer 40 uses the carrier signal to upconvert an input signal prior to transmitting same over a channel via an antenna 50. The fuzzy pseudo-random number generator 20 and the frequency synthesizer 30 comprise a fuzzy spreader.

The transmitted signal is detected by a receive antenna 60 and fed to a second conventional mixer 70. The second mixer 70 is fed by a second conventional frequency synthesizer 80. The second frequency synthesizer 80 is fed by a second fuzzy pseudo-random number generator 100. The second frequency synthesizer 80 and the second fuzzy pseudo-random number generator 100 comprise a fuzzy despreader. The fuzzy despreader provides a despreading signal to the second mixer 70. The mixer 70 uses the despreading signal to downconvert the received signal to an intermediate frequency signal. The intermediate frequency signal is filtered by a conventional bandpass filter 90 to provide output data.

Those skilled in the art will appreciate that additional components would be required in a practical communications system.

FIG. 1b is a simplified block diagram of the fuzzy pseudo-random generator of the present invention. As depicted in FIG. 1b, the fuzzy pseudo-random number generators 20, 100 of FIG. 1a include a fuzzy processor 110 and a learning or training chip 120. The learning chip 120 receives input from a conventional pseudo-random number generator 130 and an expert source 140. The pseudo-random number generator 130 and an expert source 140 are shown with dashed lines to indicate that these elements represent sources of data, not necessarily actual components. In any event, in the illustrative embodiment, the fuzzy spreader 20 and the fuzzy despreader 100 train on the same data. However, the system can be implemented to train online with data that is communicated over the link from the spreader to the despreader.

In the preferred embodiment, the fuzzy processor 110 and the learning chip 120 of the pseudo-random generators 20, 100 are implemented in software with microprocessors in accordance with the following design methodology.

First, it is assumed that the frequency synthesizers 30 and 80 generate N distinct frequencies. The bandwidth is partitioned into n frequency bins that each contain N/n frequencies to provide a balanced partition into the bins. In the illustrative embodiment, N was chosen to be 100 and n was chosen to be five.

FIG. 2 shows a partitioned spectrum for N=100 and n=5 in accordance with the method of the present invention. The frequencies are number 0, . . . , N–1 so the fuzzy pseudo-random number generators 20, 100 provide a sequence of integers {0, . . . , N–1} such that each integer tends to occur equally often.

Next, a fixed sampling pattern is chosen that decides which of a predetermined number of frequencies previously output the pseudo-random number generator 130 will give the next output of the fuzzy pseudo-random generator 20, 100. For example, at time k, output frequencies from the pseudo-random number generator 130 are sampled at time k-1, k-6, k-8, k-14, and etc. Varying the time delays between samples makes the samples appear independent from one step to the next. The number of samples that fall in the 5 frequency bins are the n inputs to the fuzzy system. These samples are stored as a length n vector $x_k$ where k is the time of the sample.

In the illustrative embodiment, the decision to use 30 samples followed directly from two other design choices. First 5 frequency bins were chosen to give approximately 200 rules, as discussed below. Then the input fuzzy sets were designed as shown in FIG. 3. Thirty [30] samples may be chosen for the illustrative embodiment by a process of trial and error based on the number of bins and rules. That is, the medium fuzzy set should have its peak at the maximum number of expected hits per bin=6 times the number of bins 5 equals 30. In designing the sampling pattern, one should endeavor to minimize the auto-correlation of the output sequence and minimize the maximum sample time delay.

For each bin, three fuzzy sets are defined: Small, Medium and Large. FIG. 3 shows these fuzzy sets or set membership functions:

$$m_S: \{0, \ldots, 30\} \to [0,1], \quad (2)$$

$$m_M: \{0, \ldots, 30\} \to [0,1], \quad (3)$$

$$m_L: \{0, \ldots, 30\} \to [0,1]. \quad (4)$$

where $m_S(u)$ indicates the degree to which the number of hits u is Small, $m_M(u)$ and $m_L$ stand for the degree to which u is medium and large, respectively. So the fuzzy sets in FIG. 3 map the number of hits $x_k[j]$ in each bin into a length-3 fit vector($m_S(x_k[j])$, $m_M(x_k[j])$, $m_L(x_k[j])$) of fit or fuzzy unit values. An input value of 6, the expected value per bin, maps to (0,1,0), 5 maps to (⅓, ⅔, 0), and 8 maps to (0, ⅓, ⅔). The fit vectors of the 5 integer inputs form a 5×3 matrix $I_k$.

$$I_k[j,1] = m_S(I_k[j]), \quad (5)$$

$$I_k[j,2] = m_M(I_k[j]), \quad (6)$$

$$I_k[j,3] = m_L(I_k[j]). \quad (7)$$

In the general case of n bins and p input fuzzy sets, $I_k$ would have dimensions n×p. $I_k$ is the input to the fuzzy system of FIG. 4.

FIG. 4 shows the parallel algorithmic structure of the fuzzy system of the present invention. Each fuzzy rule is a conditional. IF $x_k$ is $A_i$, THEN output is $B_i$. This rule equals the fuzzy patch or Cartesian product $A_i \times B_i$ in the state input-output space X×Y. The fuzzy rules or patches cover the graph of some function f:X→Y. The fuzzy system averages patches that overlap and in this way approximates f. A fuzzy system can uniformly approximate any continuous or measurable function. Each $A_i$ is a length 5 vector of fuzzy set values: Small, Medium, and Large. The antecedent (S,L,L,M,L) might read as:

IF ($x_k[1]$ is Small AND $x_k[2]$ is Large AND $x_k[3]$ is Large AND $x_k[4]$ is Medium AND $x_k[5]$ is Large) . . .

Or $A_i$ can be expressed as a 5×3 matrix $A_i$ similar to $I_k$. Each of the 5 fuzzy set values in $A_i$ maps to a unit bit vector:

Small ——> (1,0,0)

Medium ——> (0,1,0)

Large ——> (0,0,1)

So for the above antecedent $A_i$=(S,L,L,M,L), $$A_i = \begin{bmatrix} 1 & 0 & 0 \\ 0 & 0 & 1 \\ 0 & 0 & 1 \\ 0 & 1 & 0 \\ 0 & 0 & 1 \end{bmatrix}$$

At each step, the fuzzy sets in FIG. 3 map the 5 integer input values $x_k[j]$ to their membership or fit values, the degrees to which they belong to the Small, Medium, and Large fuzzy sets. Each conjunct in the antecedent of if-part of a rule takes on one of these fit values. Suppose $x_k[j]=4$. Then $x_k[j]$ is Small has the fit value $m_S(4)=⅔$. The system "fires" or activates each of the 5 if-part conjuncts in this way. A fuzzy AND operation takes the minimum of fit values. So the complete antecedent "$x_k$ is $A_i$" takes on the fit value $$m_{A_i}(x_k) = \min_j (m_{A_i[j]}(x_k[j])), \quad (8)$$

$$= \min_j (I_k A_i^T[j,j]). \quad (9)$$

The ith rule fires or activates to degree $w_{ik}$:

$$w_{ik} = m_{A_i}(I_k), \quad (10)$$

Equations (8) and (9) provide different views of a fuzzy rule. Equation (8) includes the input fuzzy sets as part of each rule. So each rule looks at how much a numerical input $x_k$ belongs to fuzzy set $A_i$ in the if-part of the rule. In equation (9), each conjunct's fit value correlates two fuzzy sets, the jth rows of $I_k$ and $A_i$. The higher the correlation between $I_k$ and $A_i$, the higher the firing level $w_{ik}$. As illustrated in FIG. 4, the firing level $w_{ik}$ scales the then-part, $B_i$, of each rule. So equation implies that each rule is a fuzzy associative memory or "FAM". The FAM rule ($A_i,B_i$) or patch $A_i \times B_i$ takes as input the fuzzy set $I_k$ for if-part, $A_i$, the matrix equivalent of $A_i$, and gives as output the fuzzy set $B_i = w_{ik} B_i$. If $I_k = A_i$, then $B_i = B_i$.

In accordance with the inventive adaptive rule generation technique of the present invention, it is noted that the then-part or consequent of each rule is a length-5 fit vector. To learn these consequents, the illustrative system trained with 10,000 samples from the IMSL uniform random number generator (a product of IMSL Inc.) scaled and truncated to give integers between 1 and 5. These integers are the bin numbers. The fuzzy system's sampling pattern gives the distribution $x_k$ of previous samples. Then the if-part term $A_i$ closest to $x_k$, the one with maximum $w_{ik}$, is identified and associated with the next sample $A_i$.

For example, given $x_k$=(5,6,3,9,7) and the next output is 4; the closest if-part term is (M,M,S,L,M). So, in accordance with the above, output bin 4 is associated with (M,M,S,L,M).

Processing all 10,000 samples in this manner gives a histogram of output bin values for each if-part term. Normalizing these histograms give fit vectors $B_i$ with Hamming norm 1. So the value of the jth component $B_i[j]$ gives the fraction of training samples that fall in bin j when the input distribution matches $A_i$. Each $B_i$ should be nearly uniform, since the samples are "random" and uniformly distributed in $\{1, \ldots, 5\}$. The $B_i$ closest to $(0.2, 0.2, 0.2, 0.2, 0.2)$ correspond to the $A_i$ that occur most often.

A uniform output distribution is desired. Symmetry helps reduce the number of training samples. Each step gives not 1 but 5 input-output pairs if the inputs and outputs are rotated. Consider the example above. From the observation, the following associations can be derived:

(M,M,S,L,M) <——>bin 4

(M,M,M,S,L) <——>bin 5

(L,M,M,M,S) <——>bin 1

(S,L,M,M,M) <——>bin 2

(M,S,L,M,M) <——>bin 3

Thus, 10,000 training samples with rotations give about the same results as 50,000 samples with no input/output rotations.

In general, the spectrum partition in FIG. 2 has n bins with p fuzzy-set values each. So there are $n^p$ possible if-part terms $A_i$. Each one may give rise to a fuzzy rule. In the illustrative embodiment, n=5 and p=3 for 243 rules maximum. Fifty-seven of the if-part terms cannot have firing levels above ⅓. This adaptive scheme does not associate these if-parts with any output bins. So each fuzzy system can have at most 186 fuzzy rules.

The combined output fuzzy set $O_k$ equals the sum of the rule then-parts $B_i$ weighted by their firing levels $w_{ik}$:

$$O_k = \sum_i w_{ik} B_i. \qquad (11)$$

This fuzzy inference method is correlation-product-inference.

FIG. 4 shows that the system fires all rules in parallel. While all rules can fire at one time, since most fire at a 0% level, it can be said that only a few rules fire at any time. In any event, this gives a fast map from an integer input vector $x_k$ to a combined output fuzzy set $O_k$.

The combined output fuzzy set $O_k$ defuzzifies or maps to a number or output frequency $y_k$. In additive fuzzy systems $O_k$ tends to be unimodal and easy to defuzzify. The centroid of the output fuzzy set gives a value near the mode. However, in the illustrative embodiment, the fuzzy frequency spreading system was designed so that $O_k$ is nearly uniform for each iteration k. The centroid might yield a value near the middle of the spectrum each time. So instead, a new type of centroid defuzzification must be used.

Figure 5:
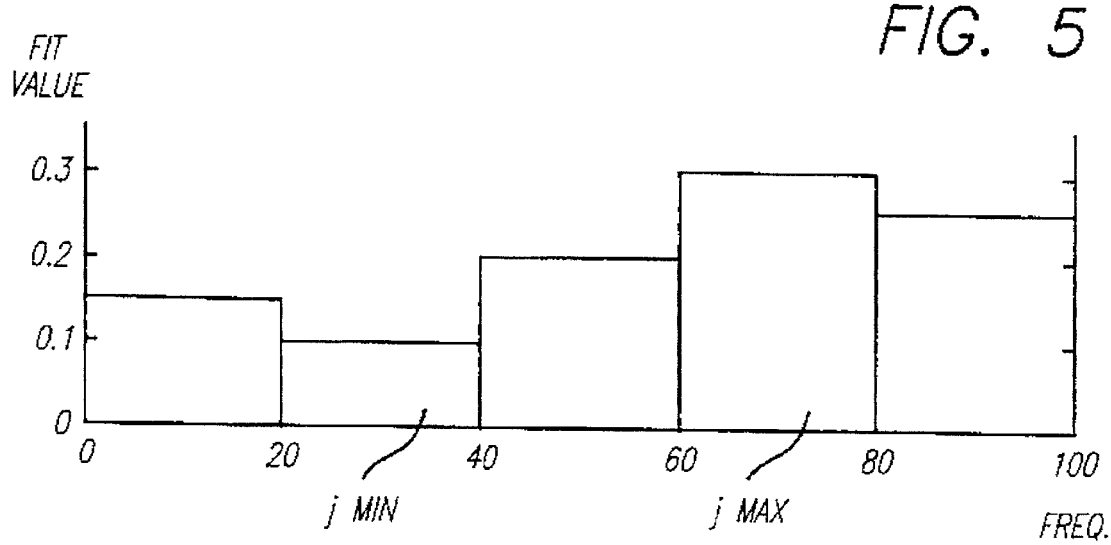
FIG. 5 is a graph of an output fuzzy set generated by the present invention.
Figure 6:
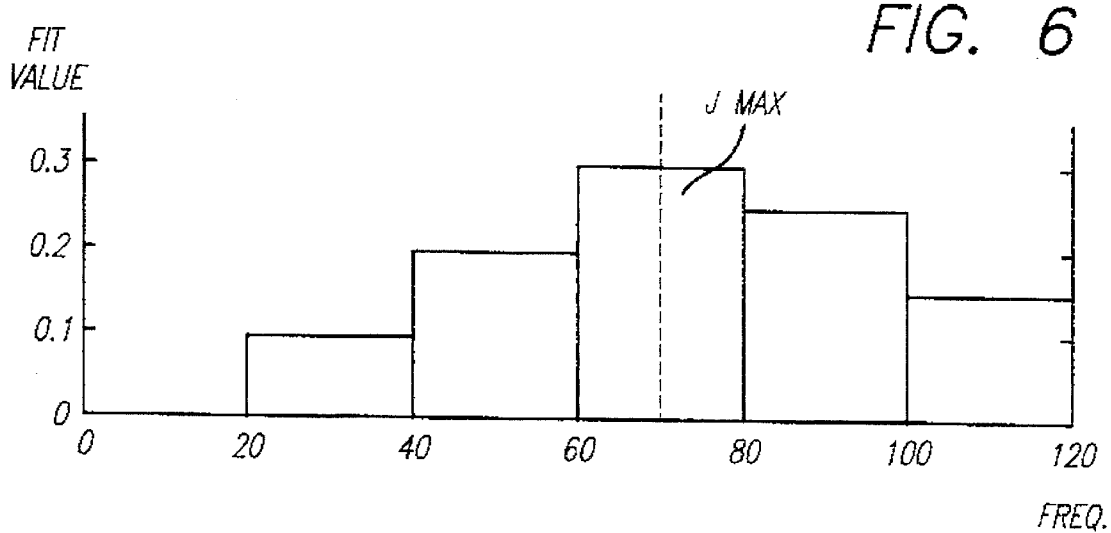
FIG. 6 is a graph of an output fuzzy set of FIG. 5 rotated in accordance with the inventive defuzzification technique of the present invention.
Figure 7:
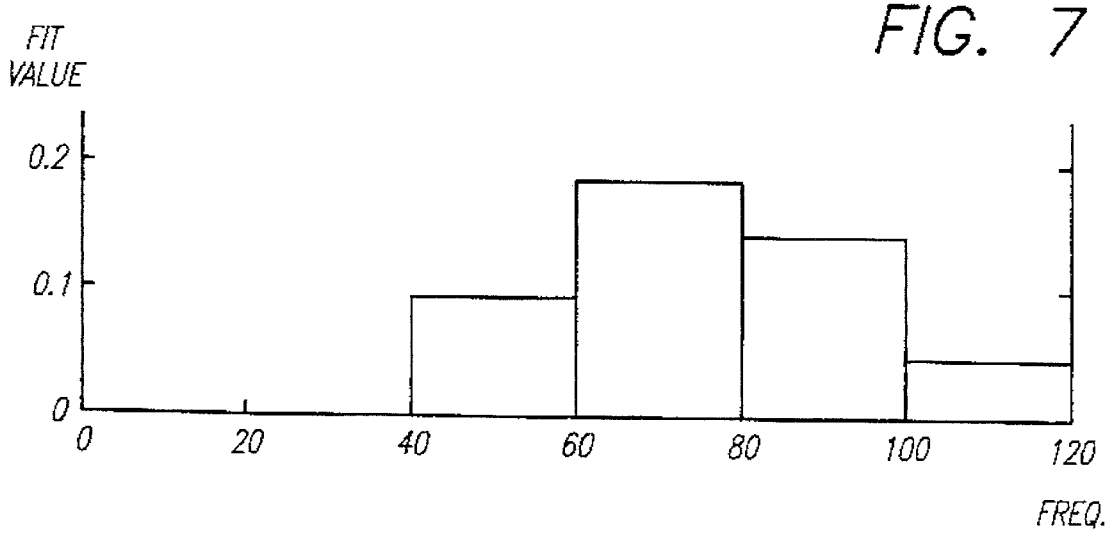
FIG. 7 is the graph of FIG. 6 with the uniform part subtracted to isolate the noise part of the output.

FIGS. 5–7 facilitate an illustration of the novel centroid defuzzification technique of the present invention. First, the output fuzzy set $O_k = (0.15, 0.10, 0.20, 0.30, 0.25)$ is graphed as illustrated in FIG. 5. In accordance with the inventive defuzzification technique, the indices of the largest and smallest terms of the output fuzzy set $O_k$ are found and denominated as $j_{max}$ and $j_{min}$. Next, as illustrated in FIG. 6, $O_k$ is rotated so that $j_{max}$ is the center bin. Then, the centroid of this fuzzy set will be near the center of bin $j_{max}$. Next, as illustrated in FIG. 7, $O_k[j_{min}]$ is subtracted from each term. This step subtracts off the uniform part and isolates the "noise" part of the output, hereinafter $O_{noise,k}$.

Next, the centroid $c_{noise,k}$ is found in accordance with equations (12–23) and then a previous output frequency $y_{k-1}$, scaled by 1/n is used to further modulate the position of the center bin:

$$y_k = [c_{noise,k} - N/2n + y_{k-r}/n] \mod N, \qquad (12)$$

where N is the number of frequencies and n=5 is the number of bins. Four different values for r (the time step back reverse index) were used. This value was changed every 250 iterations. The previous output $Y_{k-r}$ appears to be a random number but is just an entry in the deterministic frequency sequence.

In FIGS. 5–7, the elements of the output fuzzy sets are shown as rectangles of height equal to 1. The rectangles span the bins. Triangles, trapezoids, Gaussians, or any other shapes yield the same results if their centroids lie at the centers of the 5 bins. For correlation-product inference and centroid defuzzification, the shape of the output fuzzy-set elements does not affect the defuzzified result.

The centroid of $O_k$ is:

$$c_k = \frac{\sum_{j=1}^{5} O_k[j] m_j}{\sum_{j=1}^{5} O_k[j]}, \qquad (13)$$

where $m_j$ is the center of the jth bin. Rotation changes only the $m_j$'s:

$$c_{rotated,k} = \frac{\sum_{j=1}^{5} O_k[j] m_j'}{\sum_{j=1}^{5} O_k[j]}, \qquad (14)$$

where $$m_j' = \begin{cases} m_j & \text{if } |j - j_{max}| \leq 2 \\ m_j - N & \text{if } j - j_{max} > 2 \\ m_j + N & \text{if } j - j_{max} < -2 \end{cases} \qquad (15)$$

Separating $O_k$'s uniform and noise components gives $$O_k = O_{uniform,k} + O_{noise,k} \qquad (16)$$

or $$O_k[j] = O_k[j_{min}] + O_{noise,k}[j]. \qquad (17)$$

The uniform part has centroid $$c_{uniform,k} = \frac{\sum_{j=1}^{5} O_k[j_{min}] m_j'}{\sum_{j=1}^{5} O_k[j_{min}]} \qquad (18)$$

$$= \frac{O_k[j_{min}] \sum_{j=1}^{5} m_j'}{5 O_k[j_{min}]} \qquad (19)$$

$$= \frac{1}{5} \sum_{j=1}^{5} m_j'. \qquad (20)$$

$c_{uniform,k}$ does not depend on $O_k$. So the subscript k is dropped and this centroid is denominated $c_{uniform}$. If the bins have equal width, $c_{uniform}$ equals the center of the rotated spectrum.

The noise component has centroid $$c_{noise,k} = \frac{\sum_{j=1}^{5} O_{noise,k}[j]m_j'}{\sum_{j=1}^{5} O_{noise,k}[j]} \quad (21)$$

$$c_{rotated,k} = \frac{\left(\frac{5O_k[j_{min}]}{\sum_{j=1}^{5} O_k[j]}\right) c_{uniform}}{1 - \frac{5O_k[j_{min}]}{\sum_{j=1}^{5} O_k[j]}}, \quad (22)$$

from equations (17), (14) and (20).

Rewriting equation (22) yields:

$$c_{rotated,k} = \left(\frac{5O_k[j_{min}]}{\sum_{j=1}^{5} O_k[j]}\right) c_{uniform} + \left(1 - \frac{5O_k[j_{min}]}{\sum_{j=1}^{5} O_k[j]}\right) c_{notes,k}. \quad (23)$$

The first term in equation (23) draws $c_{rotated,k}$ toward the center of the rotated spectrum. So $c_{noise,k}$ varies more from the center than $c_{rotated}$ does. The difference between the two increases as $O_k$ becomes more uniform and as the first term dominates. So using $c_{noise,k}$ instead of $c_{rotated,k}$ in equation (12) gives better results. Equation (12) represents the defuzzified output.

Thus, the system depicted in FIG. 4 is a function f:X→Y. For this application, X consists of length-5 vectors of integers, and Y=[0,N], where N is the number of output frequencies. Truncation of the defuzzified output gives integers $Y_k \in \{0, \ldots, N-1\}$. Fuzzy sets map inputs to matrices of fuzzy values in [0,1]—g:X→Z. The fuzzy rules, $h_i$:Z→φ, map these fuzzy matrices to output fuzzy sets. Defuzzification maps those output fuzzy sets to output values—d:φ→Y.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A fuzzy logic spread spectrum communications system comprising:

fuzzy logic spreader for spreading an input signal over a range of frequencies and fuzzy logic despreader for extracting the spread input signal from the range of frequencies.

2. A fuzzy logic frequency spreader comprising:

a fuzzy logic pseudo-random number generator and frequency synthesizer means, responsive to the fuzzy logic pseudo-random number generator, for upconverting an input signal to a range of frequencies.

3. A fuzzy logic despreader comprising:

a fuzzy pseudo-random number generator and means, responsive to the fuzzy pseudo-random number generator, for downconverting a fuzzy spread received signal.

4. A fuzzy logic pseudo-random number generator comprising:

first means for generating a plurality of pseudo-random numbers out of a predetermined range of N distinct possible integer numbers over each of a plurality of predetermined time intervals;

second means for partitioning the predetermined range of N distinct numbers into n bins, each bin containing N/n of the possible distinct numbers;

third means for sampling the pseudo-random numbers to provide a plurality of pseudo-random samples having a minimum auto-correlation and a minimum time delay therebetween;

fourth means for counting the number of samples that fall into each bin to provide a count for each bin;

fifth means for defining a number of fuzzy logic sets for each bin relating to the number of samples in each bin;

sixth means for mapping the count in each bin into the sets, each count belonging to each set in some proportion and the total extent to which each count belongs to all of the sets being equal to unity;

seventh means for applying fuzzy logic if-then rules to the sets to determine a firing level of each rule over each predetermined time interval, the rules covering a graph of a random function, each conjunct in each antecedent of each rule being equal to a fit value corresponding to the extent to which each count belongs to each set;

eighth means for determining an extent to which each rule is activated by identifying a minimum fit value for antecedent of each rule;

ninth means for weighting the consequent of each rule in proportion to the extent to which the antecedent of each rule is activated; and tenth means for summing each of the weighted consequents to create a set of pseudo-random fuzzy logic output numbers, each number corresponding to an associated bin.

5. The invention of claim 4 including eleventh means for defuzzifying the set of pseudo-random fuzzy logic output numbers to provide an output pseudo-random number.

6. The invention of claim 5 wherein the eleventh means includes twelfth means for determining a centroid of the set of pseudo-random fuzzy logic output numbers.

7. A method for generating a pseudo-random number including the steps of:

generating a plurality of pseudo-random numbers out of a predetermined range of N distinct possible integer numbers over each of a plurality of predetermined time intervals;

partitioning the predetermined range of N distinct numbers into n bins, each bin containing N/n of the possible distinct numbers;

sampling the pseudo-random numbers to provide a plurality of pseudo-random samples having a minimum auto-correlation and a minimum time delay therebetween;

counting the number of samples that fall into each bin to provide a count for each bin;

defining a number of fuzzy logic sets for each bin relating to the number of samples in each bin;

mapping the count in each bin into the sets, each count belonging to each set in some proportion and the total extent to which each count belongs to all of the sets being equal to unity;

applying fuzzy logic if-then rules to the sets to determine a firing level of each rule over each predetermined time interval, the rules covering a graph of a random function, each conjunct in each antecedent of each rule being equal to a fit value corresponding to the extent to which each count belongs to each set;

determining an extent to which each rule is activated by identifying a minimum fit value for antecedent of each rule;

weighting the consequent of each rule in proportion to the extent to which the antecedent of each rule is activated; and summing each of the weighted consequents to create a set of pseudo-random output numbers, each number corresponding to an associated bin.

8. The invention of claim 7 including the step of defuzzifying the set of pseudo-random output numbers to provide an output pseudo-random number.

9. The invention of claim 8 wherein the step of defuzzifying the set of pseudo-random output numbers to provide an output pseudo-random number includes the step of determining a centroid of the set of pseudo-random output numbers.

10. The invention of claim 9 wherein the step of determining the centroid includes the step of rotating the set of pseudo-random output numbers so that a maximum output number is in a middlemost bin.

11. The invention of claim 10 wherein the step of determining the centroid includes the step of subtracting the smallest value in the output set from each value in the output set to provide a noise output set.

12. The invention of claim 11 wherein the step of determining the centroid includes the step of finding a centroid of noise output set.

13. The invention of claim 12 wherein the step of determining the centroid includes the step of combining the centroid of the noise output set with a previous output number scaled by 1/n to provide the output number.

14. The invention of claim 7 including the step of adapting the consequents of each rule.

15. The invention of claim 14 wherein the step of adapting the consequents of each rule includes the step of scaling and truncating a predetermined number of samples from a uniform random number generator to provide a plurality of integers between 1 and n.

16. The invention of claim 15 wherein the step of adapting the consequents of each rule includes the step of providing a distribution of previous samples.

17. The invention of claim 16 wherein the step of adapting the consequents of each rule includes the step of identifying an antecedent of one of the rules which has a maximum fit value with the distribution of previous samples.

18. The invention of claim 17 wherein the step of adapting the consequents of each rule includes the step of associating a next sample with the antecedent of one of the rules which has a maximum fit value with the distribution of previous samples.

19. The invention of claim 18 wherein the step of adapting the consequents of each rule includes the step of associating each of the predetermined number of samples with the antecedent of one of the rules which has a maximum fit value with a distribution of previous samples to provide a histogram of output bin values for each antecedent of each rule.

20. The invention of claim 19 wherein the step of adapting the consequents of each rule includes the step of normalizing the histograms to provide the adapted consequents of the rules.

* * * * *